US008238442B2

(12) United States Patent
Liu

(10) Patent No.: US 8,238,442 B2
(45) Date of Patent: Aug. 7, 2012

(54) METHODS AND APPARATUS FOR CONCEALING CORRUPTED BLOCKS OF VIDEO DATA

(75) Inventor: Shan Liu, Cambridge, MA (US)

(73) Assignee: Sony Computer Entertainment Inc., Tokyo (JP)

( * ) Notice: Subject to any disclaimer, the term of this patent is extended or adjusted under 35 U.S.C. 154(b) by 1372 days.

(21) Appl. No.: 11/844,302

(22) Filed: Aug. 23, 2007

(65) Prior Publication Data

US 2008/0049845 A1     Feb. 28, 2008

Related U.S. Application Data

(60) Provisional application No. 60/823,605, filed on Aug. 25, 2006, provisional application No. 60/823,613, filed on Aug. 25, 2006, provisional application No. 60/823,620, filed on Aug. 25, 2006.

(51) Int. Cl.
*H04N 7/12*     (2006.01)
*H04N 11/02*    (2006.01)
*H04N 11/24*    (2006.01)

(52) U.S. Cl. ......... 375/240.27; 375/240.16; 375/240.25; 348/720; 348/731

(58) Field of Classification Search ............. 375/240.27, 375/240.16, 240.25; 348/240.16, 720, 721
See application file for complete search history.

(56) References Cited

U.S. PATENT DOCUMENTS

| | | | |
|---|---|---|---|
| 4,376,290 A * | 3/1983 | Shirota | 386/247 |
| 4,429,334 A * | 1/1984 | Hashimoto et al. | 386/263 |
| 5,243,428 A * | 9/1993 | Challapali et al. | 348/607 |
| 5,768,481 A | 6/1998 | Chan et al. | |
| 5,786,858 A | 7/1998 | Yagasaki | |
| 5,805,735 A | 9/1998 | Chen et al. | |
| 5,815,636 A * | 9/1998 | Fujii et al. | 386/264 |
| 6,052,159 A * | 4/2000 | Ishii et al. | 375/240.27 |
| 6,115,496 A | 9/2000 | Nguyen et al. | |
| 6,198,849 B1 | 3/2001 | Fischer et al. | |
| 6,327,391 B1 * | 12/2001 | Ohnishi et al. | 382/236 |
| 6,404,817 B1 | 6/2002 | Saha et al. | |
| 6,480,546 B1 * | 11/2002 | Kim et al. | 375/240.27 |
| 6,636,565 B1 * | 10/2003 | Kim | 375/240.27 |
| 7,881,367 B2 * | 2/2011 | Jung | 375/240.01 |
| 7,916,796 B2 * | 3/2011 | Yan | 375/240.27 |
| 2001/0005399 A1 * | 6/2001 | Kimoto | 375/240.27 |
| 2002/0109787 A1 * | 8/2002 | Moni et al. | 348/616 |

(Continued)

FOREIGN PATENT DOCUMENTS

EP            920214 A2 *    6/1999

OTHER PUBLICATIONS

Aign, Susanna et al. "Temporal & Spatial Error Concealment Techniques for Hierarchical MPEG-2 Video Codec", 1995.*

(Continued)

*Primary Examiner* — Michael Simitoski
(74) *Attorney, Agent, or Firm* — Joshua D. Isenberg; JDI Patent

(57) ABSTRACT

Methods and apparatus for concealing corrupted blocks of streaming data are disclosed. It is determined whether a subdivision of the streaming data is a corrupt subdivision. The corrupt subdivision is concealed using a previously reconstructed or concealed subdivision in a manner that does not require information from pairs of direct neighbor subdivisions that have not been previously reconstructed or concealed.

10 Claims, 5 Drawing Sheets

U.S. PATENT DOCUMENTS

| | | | |
|---|---|---|---|
| 2002/0143792 A1 | 10/2002 | Belu | |
| 2002/0181594 A1* | 12/2002 | Katsavounidis et al. | 375/240.24 |
| 2003/0012286 A1* | 1/2003 | Ishtiaq et al. ............ | 375/240.27 |
| 2004/0101059 A1* | 5/2004 | Joch et al. ................ | 375/240.29 |
| 2004/0258151 A1* | 12/2004 | Spampinato ............ | 375/240.03 |
| 2005/0157799 A1* | 7/2005 | Raman et al. ............ | 375/240.27 |
| 2005/0207490 A1* | 9/2005 | Wang et al. .............. | 375/240.15 |
| 2005/0254584 A1* | 11/2005 | Kim et al. ................ | 375/240.27 |
| 2005/0259735 A1* | 11/2005 | Zhu .......................... | 375/240.16 |
| 2006/0013320 A1* | 1/2006 | Oguz et al. ............... | 375/240.27 |
| 2006/0072676 A1* | 4/2006 | Gomila .................... | 375/240.27 |
| 2006/0098734 A1 | 5/2006 | Cho et al. | |
| 2006/0188025 A1* | 8/2006 | Hannuksela ............. | 375/240.27 |
| 2007/0074206 A1 | 3/2007 | Iwamoto | |
| 2008/0225946 A1* | 9/2008 | Yin et al. ................. | 375/240.12 |

OTHER PUBLICATIONS

Asbun, Eduardo et al. "Real-time Error Concealment in Digital Video Streams Using Digital Signal Processors", 2001.*

Chen, Bor Nang et al. "Hybrid Error Concealment Using Linear Interpolation", 2006.*

Kwon, Soon-kak et al. "Overview of H.264/MPEG-4 part 10", Aug. 2005.*

Pastrnak, Milan et al. "Adaptive Decoding of MPEG-4 Sprites for Memory-Constrained Embedded Systems", 2005.*

Peng, Qiang et al. "Block-Based Temporal Error Concealment for Video Packet Using Motion Vector Extrapolation", 2002.*

Sullivan, Gary J. et al. "Video Compression—From Concepts to the H.264/AVC Standard", 2005.*

Sullivan, Gary et al. Standard document "JVT-1049", Sep. 2003.*

Tsekeridou, Sofia et al. "MPEG-2 Error Concealment based on Block Matching Principles", 2000.*

Tsekeridou, Sofia et al. "An Error Concealment Scheme for MPEG-2 Coded Video Sequences", 1997.*

Wiegand, Thomas. Standard document "JVT-D015", 2002.*

Xu, Yanling et al. "H.264 Video Communication Based Refined Error Concealment Schemes", 2004.*

Sun, Huifang et al. "Error concealment algorithms for robust decoding of MPEG compressed video", 1997.*

Halbach, Till and Tor A. Ramstad. "Multidimensional Adaptive Nonlinear filters for concealment of interlaced video", 2003.*

U.S. Appl. No. 60/823,605 to Shan Liu et al., entitled "System and Methods for Detecting and Handling Errors in a Multi-Threaded Video Data Decoder", filed Aug. 25, 2006.

U.S. Appl. No. 60/823,613 to Shan Liu, entitled "Methods and Apparatus for Concealing Corrupted Blocks of Video Data", filed Aug. 25, 2006.

U.S. Appl. No. 60/823,620 to Xun Xu, entitled "Entropy Decoding Methods and Apparatus", filed Aug. 25, 2006.

U.S. Appl. No. 11/844,287, to Shan Liu et al., entitled "System and Methods for Detecting and Handling Errors in a Multi-Threaded Video Data Decoder", filed Aug. 23, 2007.

U.S. Appl. No. 11/844,319, to Xun Xu, entitled "Entropy Decoding Methods and Apparatus", filed Aug. 23, 2007.

Sony Computer Entertainment Incorporated, "Cell Broadband Engine Architecture", Version 1.0, Aug. 8, 2005.

U.S. Appl. No. 12/469,496, filed May 20, 2009.

Draft of Version 4 of H.264/AVC (ITU-T Recommendation H.264 and ISO/IEC 14496-10 (MPEG-4 part 10) Advanced Video Coding) by Gary Sullivan, Thomas Wiegand and Ajay Luthra, Joint Video Team (JVT) of ISO/IEC MPEG & ITU T VCEG (ISO/IEC JTC1/SC29/WG11 and ITU T SG16 Q.6), 14th Meeting: Hong Kong, CH Jan. 18-21, 2005.

Non Final Office action mailed date Jan. 6, 2012 for U.S. Appl. No. 11/844,287.

* cited by examiner

METHODS AND APPARATUS FOR CONCEALING CORRUPTED BLOCKS OF VIDEO DATA

PRIORITY CLAIM

This application claims the benefit of priority co-pending provisional application No. 60/823,605, to Shan Liu, Jason Wang and Milan Mehta, entitled "SYSTEM AND METHODS FOR DETECTING AND HANDLING ERRORS IN A MULTI-THREADED VIDEO DATA DECODER" filed Aug. 25, 2006, the entire disclosures of which are incorporated herein by reference.

This application claims the benefit of priority co-pending provisional application No. 60/823,613, to Shan Liu, entitled "METHODS AND APPARATUS FOR CONCEALING CORRUPTED BLOCKS OF VIDEO DATA" filed Aug. 25, 2006, the entire disclosures of which are incorporated herein by reference.

This application claims the benefit of priority co-pending provisional application No. 60/823,620, to Xun Xu, entitled "ENTROPY DECODING METHODS AND APPARATUS", filed Aug. 25, 2006 the entire disclosures of which are incorporated herein by reference.

CROSS-REFERENCE TO RELATED APPLICATION

This application is related commonly-assigned, co-pending application Ser. No. 11/844,287, to Shan Liu et al., entitled "SYSTEM AND METHODS FOR DETECTING AND HANDLING ERRORS IN A MULTI-THREADED VIDEO DATA DECODER", filed the same day, as the present application, the entire disclosures of which are incorporated herein by reference.

This application is related commonly-assigned, co-pending application Ser. No. 11/844,319, to Xun Xu, entitled "ENTROPY DECODING METHODS AND APPARATUS", filed the same day, as the present application, the entire disclosures of which are incorporated herein by reference.

FIELD OF THE INVENTION

Embodiments of the present invention are related to streaming media and more particularly to error concealment in streaming media.

BACKGROUND OF THE INVENTION

Digital signal compression is widely used in many multimedia applications and devices. Digital signal compression using a coder/decoder (codec) allows streaming media, such as audio or video signals to be transmitted over the Internet or stored on compact discs. A typical codec involves an encoder on the transmitting side and a decoder on the receiving side. Encoders and decoders may be implemented in hardware or software or some combination of both. A number of different standards of digital video compression have emerged, including H.261, H.263; MPEG-1, MPEG-2, MPEG-4; and AVC (H.264). These standards, as well as other video compression technologies, seek to efficiently represent a video frame picture by eliminating the spatial and temporal redundancies in the picture and among successive pictures. Through the use of such compression standards, video contents can be carried in highly compressed video bit streams, and thus efficiently stored in disks or transmitted over networks.

Unfortunately, the storage media and networks are not always reliable, so that errors may occur during storage or transmission. Thus, some video stream data may be corrupted, which may result in termination of decoding/playing; or, if the decoding continues, some damaged picture frames or partial frames. Such errors may propagate to the following pictures, due to the predictive nature of video compression. Overall, errors result in poor video playback; therefore, they need to be properly handled in order to mitigate their impact. Consequently, there are needs for efficient error concealment methods, by using which, the corrupted video pictures can be concealed and the display quality may be enhanced. In block-based video compression standards and codecs, such as H.261, H.263, MPEG-1, MPEG-2, MPEG-4 and H.264/AVC, video blocks (or macroblocks) are considered the basic encoding, decoding and processing unit. Thus, by concealing all corrupted video blocks, a video picture may be concealed.

Sometimes, after a decoder has done what it can do best, with or without using error resilience methods, there are still errors in the video stream that can not be recovered. If not concealed properly, these errors may be reflected in the reconstructed or displayed video pictures and are also likely to propagate to following pictures. Some error resilience and concealment techniques are available for existing codecs. For example, the H.264/AVC standard summarized a list of those technologies and gives an example of video block error concealment in the decoder extension. The error resilience methods include: Intra Placement, Picture Segmentation, Reference Picture Selection, Data Partitioning, Parameter Sets, Flexible Macroblock Ordering and Redundant Slices. These methods are usually implemented in the encoder to protect the bit stream from errors, or provide redundant information for the decoder, so that the decoder can recover the corrupted bit stream and resume decoding more easily. However, there are shortcomings to existing error concealment techniques.

It is within this context that embodiments of the present invention arise.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Figure 1:
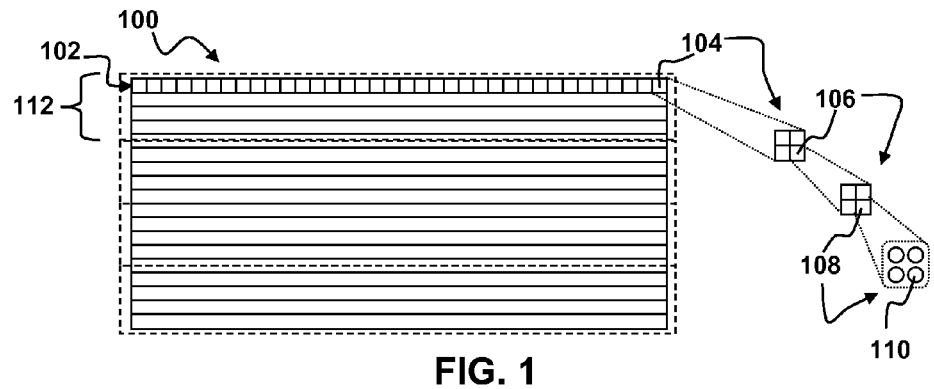
FIG. 1 is a schematic diagram illustrating division of a picture for error concealment according to embodiments of the present invention.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

DEFINITIONS

In the following discussion, the following terms have the following meanings.

A bitstream is a sequence of bits that forms the representation of coded pictures and associated data forming one or more coded video sequences.

A block is an M×N (M-column by N-row) array of samples, or an M×N array of transform coefficients.

A bottom field is one of two fields that comprise a frame. Each row of a bottom field is spatially located immediately below a corresponding row of a top field.

A bottom macroblock (of a macroblock pair) is the macroblock within a macroblock pair that contains the samples in the bottom row of samples for the macroblockpair. For a field macroblock pair, the bottom macroblock represents the samples from the region of the bottom field of the frame that lie within the spatial region of the macroblock pair. For a frame macroblock pair, the bottom macroblock represents the samples of the frame that lie within the bottom half of the spatial region of the macroblock pair.

Can is a term used to refer to behavior that is allowed, but not necessarily required.

A coded picture is a coded representation of a picture. A coded picture may be either a coded field or a coded frame. Coded picture is a collective term referring to a primary coded picture or a redundant coded picture, but not to both together.

A coded representation is a streaming data element as represented in its coded form.

Co-located is a term used to describe the location of a block or macroblock in one picture relative to a location in a different picture. Two blocks or macroblocks are said to be co-located when each has the same location within its picture as the other.

A corrupt subdivision or error subdivision is a subdivision of a picture that either contains an error or has been marked as containing an error.

A decoded picture is a picture derived by decoding a coded picture. A decoded picture may be either a decoded frame, or a decoded field. A decoded field is either a decoded top field or a decoded bottom field.

A decoder is an embodiment of a decoding process.

Decoding order refers to the order in which syntax elements are processed by the decoding process.

Decoding refers to the process of reading a bitstream and deriving decoded pictures from it.

A direct neighbor of a particular subdivision is another subdivision of a picture that is located immediately to the left, right, top or bottom of a particular subdivision of the picture.

A field is an assembly of alternate rows of a frame. A frame is composed of two fields, a top field and a bottom field.

A field block (or macroblock) is a block (or macroblock) containing samples from a single field. All macroblocks of a coded field are field macroblocks. When macroblock-adaptive frame/field decoding is in use, some macroblocks of a coded frame may be field macroblocks.

A field macroblock pair is a macroblock pair decoded as two field macroblocks.

A frame contains an array of luma samples and two corresponding arrays of chroma samples. A frame consists of two fields, a top field and a bottom field.

A frame macroblock is a macroblock representing samples from the two fields of a coded frame. When macroblock-adaptive frame/field decoding is not in use, all macroblocks of a coded frame are frame macroblocks. When macroblock-adaptive frame/feld decoding is in use, some macroblocks of a coded frame may be frame macroblocks.

A frame macroblock pair is macroblock pair decoded as two frame macroblocks.

An I slice is a slice that is decoded using prediction from decoded samples within the same slice.

Inter coding is coding of a block, macroblock, slice, or picture that uses inter prediction.

An inter prediction is A prediction derived from decoded samples of reference pictures other than the current decoded picture.

An intra prediction is a prediction derived from the decoded samples of the same decoded slice.

Luma is an adjective specifying that a sample array or single sample is representing the monochrome signal related to the primary colors. NOTE—The term luma is sometimes used rather than the term luminance in order to avoid the implication of the use of linear light transfer characteristics that is often associated with the term luminance.

Macroblock-adaptive frame/field decoding is a decoding process for coded frames in which some macroblocks may be decoded as frame macroblocks and others may be decoded as field macroblocks.

May is a term used to refer to behavior that is allowed, but not necessarily required.

A motion vector is a two-dimensional vector used for inter prediction that provides an offset from the coordinates in the decoded picture to the coordinates in a reference picture.

A P slice is a slice that may be decoded using intra prediction from decoded samples within the same slice or inter prediction from previously-decoded reference pictures, using at most one motion vector and reference index to predict the sample values of each block.

A picture is collective term for a subdivision of streaming data that can be either a field or a frame.

Prediction refers to the use of a predictor to provide an estimate of the sample value or data element currently being decoded.

A predictor is a combination of specified values or previously decoded sample values or data elements used in the decoding process of subsequent sample values or data elements.

A raster scan is a mapping of a rectangular two-dimensional pattern to a one-dimensional pattern such that the first entries in the one-dimensional pattern are from the first top row of the two-dimensional pattern scanned from left to right, followed similarly by the second, third, etc. rows of the pattern (going down) each scanned from left to right.

A reference picture is a picture containing samples that may be used for inter prediction in the decoding process of subsequent pictures in decoding order.

A slice is an integer number of macroblocks or macroblock pairs ordered consecutively in a picture or subsection thereof.

A slice header is a part of a coded slice containing the data elements pertaining to the first or all macroblocks represented in the slice.

A streaming data element refers to a smallest unit of streaming data. In the case of streaming video data a pixel is an example of a streaming data element.

A subdivision of a picture refers to a group of one or more streaming data elements that make up a picture. In the case of video streaming data, examples of subdivisions include pictures, frames, fields, slices, macroblocks, sub-macroblocks, blocks, and pixels.

Introduction

Several methods for concealing corrupted video blocks are described herein. These methods may be applied to intra and non-intra (inter) coded blocks of streaming data, e.g., in intra-coded and inter-coded streaming data subdivisions. An inter-coded subdivision (e.g., picture macroblock, etc.) is one that is coded in a way that relates two different macroblocks from different pictures. An intra coded subdivision, by contrast is coded in a way that relates two different macroblocks in the same picture or is otherwise independent of other macroblock data. The methods—of recovering motion vectors for corrupted video blocks are presented as well, which are used in concealing inter coded blocks.

To facilitate understanding of embodiments of the present invention it is useful to be familiar with certain nomenclature used herein. Streaming data may be broken down in suitable sized subdivisions for handling. For example, in the case of video data, the streaming data may be broken down into pictures with each picture representing a particular image in a series of images. Each picture may be broken down into subdivisions referred to as macroblocks, sub-macroblocks, blocks and pixels. As shown in FIG. 1, a single picture 100 may be broken down into a number of slices 102. Each slice 102 contains one or more rows of macroblocks 104. The number of macroblocks in a row depends on the size of the macroblocks and the size and resolution of the picture 100. For example, if each macroblock contains sixteen pixels then the number of macroblocks in each row may be determined by dividing the width of the picture 100 (in pixels) by sixteen. Each macroblock 104 may be broken down into a number of sub-macroblocks 106. Each sub-macroblock 106 may be broken down into a number of blocks 108 and each block may contain a number of pixels 110. By way of example, and without limitation of the invention, in a common video coding scheme, each macroblock 104 may be broken down into four sub-macroblocks 106. Each sub-macroblock may be broken down into four blocks 108 and each block may contain four pixels 110.

Error concealment according to embodiments of the present invention may arise in the context of decoding and reconstructing streaming data. In the block (or macroblock in most video codecs, i.e. MB) decoding and reconstructing loop, if any error is detected when decoding the MB (syntax or data) from the bit stream, this MB can not be reconstructed properly as an error-free ME. Instead, it is sent, to a MB concealment module and concealed from previously' decoded or recovered information. The MB concealment module may be implemented in parallel with MB decoding and reconstructing module in the picture decoder flow. As used herein the expression "processing in parallel" means that, to some extent the processing of different tasks overlaps in time.

Figure 2:
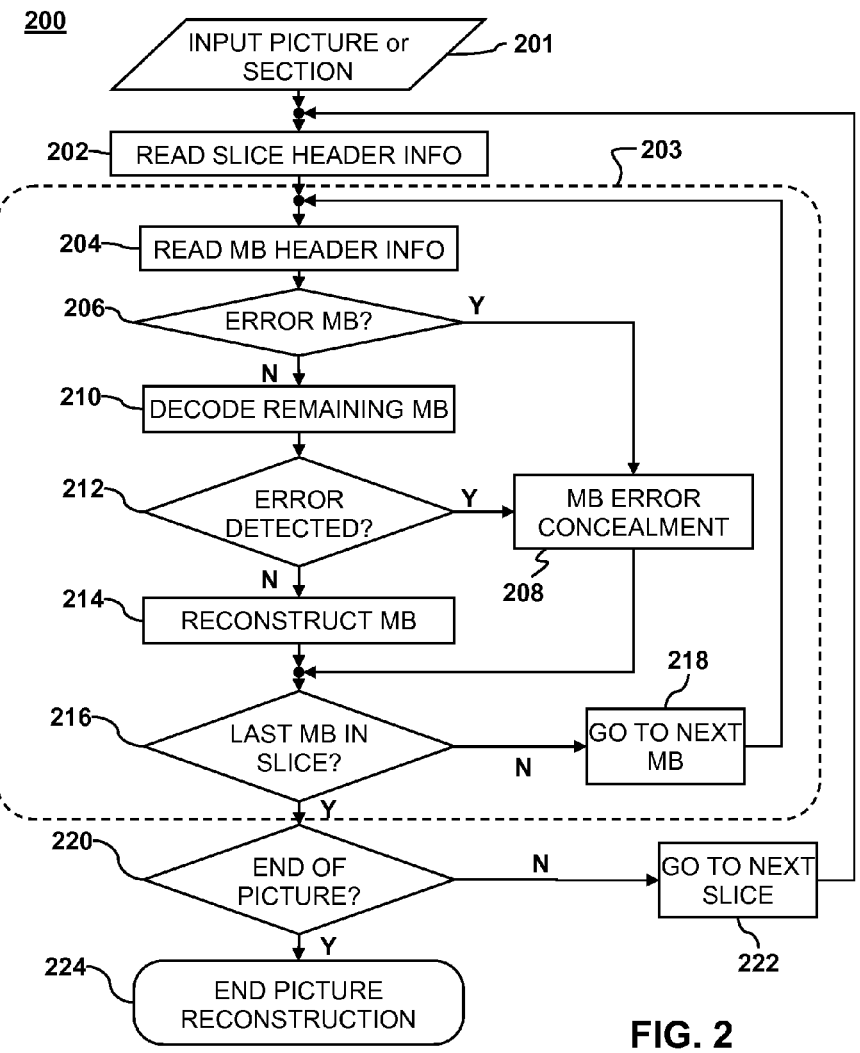
FIG. 2 is a flow diagram illustrating error handling in reconstruction of streaming data according to an embodiment of the present invention.

FIG. 2 illustrates an example of a method 200 of decoding and reconstructing an input picture 201 in a streaming data video decoder. The decoder may be implemented in hardware, in software, or some combination of both. In the method 200 a decoder reads a picture header and slice header information at 202. Subdivisions, such as macroblocks, may be marked as corrupt macroblocks during slice header decoding 202 or MB header decoding 204 if an error is detected in the slice header for the slice containing the macroblock. If an error is detected in the picture header, the entire picture may be replaced, e.g., with a blank or uniformly grey picture. The decoder then enters a macroblock loop 203, to decode the remaining data of each macroblock and reconstruct it. At 204 the decoder reads the macroblock header information. If at 206 it is determined that the macroblock is corrupt, or has been marked as a erroneous macroblock, it is sent to error an concealment module 208 without further decoding and decoding 210, error detection 212 and reconstruction 214 may be skipped.

If the macroblock has not been marked as erroneous, the decoder proceeds to decode the remaining macroblock data at 210. If decoder detects any error at 212 in the remaining macroblock data, the macroblock is marked as an erroneous macroblock and sent to error the concealment module 208 without further decoding and reconstruction 214 may be skipped. Otherwise, the macroblock is fully decoded and reconstructed.

Errors may be detected at 212, or during macroblock header decoding 202 or macroblock header decoding 204, e.g., by comparing the header syntax against standard that defines acceptable or "legal" values or ranges for the various elements that make up the header syntax. An error may be present if the value of a syntax element lies outside the "legal" range for that element as defined by the standard. Alternatively, even if a syntax element violates a semantic rule. For example, even if a syntax element value is legal, an error message may be generated if the value violates some constraint of the streaming standard used in transmitting the data. In such a case the stream cannot be accepted as a valid stream. For example, a syntax element may indicate that the input picture 201 is a bi-predictive (B) picture, but B pictures are not allowed in this stream. Alternatively, two legal syntax element values may conflict with each other in some way.

The error concealment module 208 reconstructs the corrupted macroblock using previously decoded macroblock pixels in the present or previously decoded pictures. The error concealment module may reconstruct the corrupted macroblock in accordance with embodiments of the present invention as described below, e.g., with respect to FIG. 5A, FIG. 5B, FIG. 6, FIG. 7 and FIG. 8.

The macroblock loop 203 of the decoder determines whether the last macroblock in the slice has been encountered at 216. If not, the macroblock loop proceeds to process the next macroblock as indicated at 218. If the last macroblock in a slice has been encountered it is determined at 220 whether the end of the picture has been encountered. If not, the decoder proceeds to the next slice at 222. After all macroblocks for each slice in the picture have been reconstructed (or concealed), the picture reconstruction ends as indicated at 224.

To appreciate the advantages of the present invention it is useful to understand previous error concealment techniques. For example, as suggested in H.264/AVC decoder extension, if the corrupted macroblock is an intra coded macroblock, it is concealed from the boundary pixels of its four direct neighbor macroblocks. To calculate the value for a pixel in an intra coded macroblock, both the weighted average of the top and bottom reference pixels, and that of the left and right reference pixels, are calculated. The average of the two is the concealed value for the pixel in the corrupted intra macroblock. Noted in the standard document, if the number of correct neighbors are equal or greater than 2, then only correctly decoded neighbors are used as reference; otherwise, both correct and concealed neighbors are used. Standard methods provide solutions to concealing an intra macroblock when top-bottom, and/or left-right neighbors are available (decoded or concealed) in pairs. Such pairs of direct neighbors, e.g., top-bottom or left-right neighbors are referred to herein as pairs of direct neighbor subdivisions.

Figure 3:
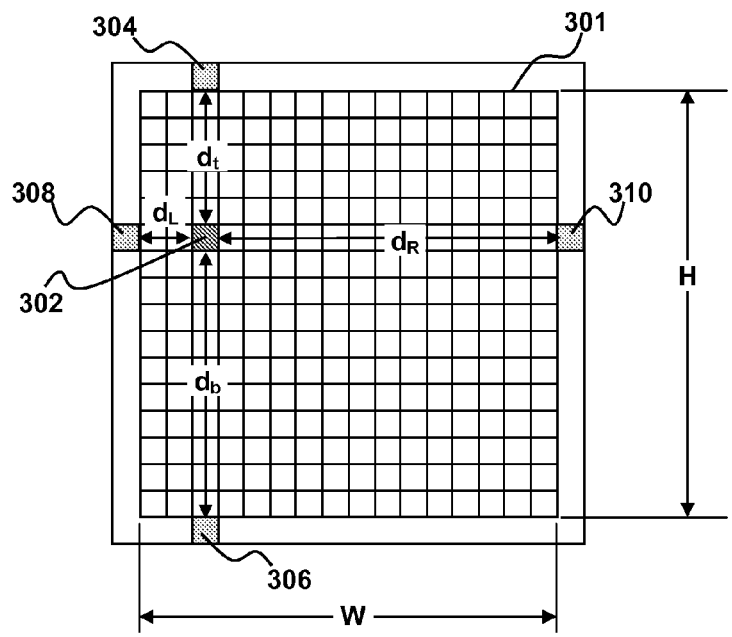
FIG. 3 is a schematic diagram illustrating concealment of a corrupt intra macroblock in accordance with the prior art.

For example, FIG. 3 illustrates pictorially how an intra-coded macroblock (MB) may be concealed in the H.264/AVC decoder extension. For a pixel 302 in a corrupted macroblock 301, a top reference pixel 304 is a bottom boundary pixel in a top MB (e.g., the MB immediately above the corrupted MB 301. The bottom boundary pixel 304 has the same horizontal index as the corrupted pixel 302. A bottom reference pixel 306 is a top boundary pixel in a bottom MB (e.g., a macroblock immediately below the corrupted MB 301). The top boundary pixel 306 has the same horizontal index as the corrupted pixel 302. A left reference pixel 308 is a right boundary pixel in a left MB (e.g., a MB immediately to the right of the corrupted MB 301), which has the same vertical index as the corrupted pixel 302. A right reference pixel 310 is a left boundary pixel in a right MB (e.g., a MB immediately to the right of the corrupted MB 301), which has the same vertical index as the corrupted pixel. Weighted averages of the top and bottom reference pixels 304, 306 and the left and right reference pixels 308, 310, are calculated.

In each case the weights may be based on the distance between the corrupted pixel and the reference pixel. A weight $w_t$ for the top reference pixel 304 may be computed from the distance $d_t$ between the corrupted pixel 302 and the top reference pixel 304 and the height H of the corrupted macroblock 301. For example the weight $w_t$ may be given by $w_t=(H-d_t)/H$. Similarly, A weight $w_b$ for the bottom reference pixel 306 may be computed from the distance $d_b$ between the corrupted pixel 302 and the bottom reference pixel 306 and the height H of the corrupted macroblock 301 as $w_b=(H-d_b)/H$. Weights $W_L$, $W_R$ for the left and right reference pixels 308, 310 may similarly be calculated using the distances $d_L$ and $d_R$ between these reference pixels and the corrupted pixel 302 and a width W of the corrupted macroblock 301. For example the weight $W_L$ may be calculated as $w_b=(W-d_L)/W$ and the weight $W_R$ may be calculated as $W_R=(W-d_R)/W$.

An average of the two weighted averages may then be used as the concealed pixel value. The drawback of this method is that, when one of the elements in a reference pixel 304, 306, 308, 310 is not available, the weighted average can not be computed properly. For example, if only one of the neighboring macroblocks to the corrupted macroblock 302 (e.g. top or left) is available while the other (e.g. bottom or right) is not, the weighted average can not be computed, and thus the corrupted pixel block can not be concealed. Unfortunately, this happens very often in real-world applications.

If the block is non-intra (i.e. inter) coded, it is usually recovered from the matching block(s) in the previously reconstructed reference picture(s). The matching block in the reference picture can either be collocated block with respect to the corrupted block in the present picture, or located with motion compensation, using recovered motion vectors. The motion vectors of the corrupted video block can be recovered from the motion vectors of neighbor blocks, such as suggested in H.264/AVC decoder extension. The neighbor motion vectors (of 16×16 macroblock, 8×8 sub-macroblock or average of 4×4, 4×8 block) are examined by the "boundary-matching" method, and the motion vector set with the minimum boundary-matching error is selected to be the concealed motion vectors.

Figure 4A:
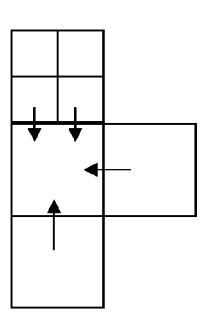
FIGS. 4A-4B are schematic diagrams illustrating concealment of a corrupt inter macroblock in accordance with the prior art.
Figure 4B:
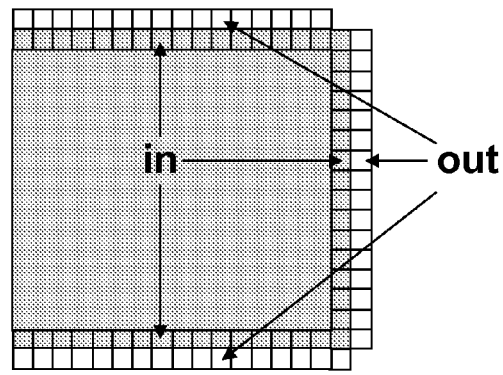

FIGS. 4A-4B illustrate an example on how H.264/AVC decoder extension recovers the motion vector of corrupted MB from neighbor motion vectors. As seen from FIG. 4A, a corrupted MB (in gray) has three available neighbor MBs, top, right and bottom. The top MB is split into four sub-macro blocks and each sub-macroblock has its own motion vector indicated by the downward pointing vertical arrows. The bottom MB as well as the right MB may be coded as one unit, and thus has only one motion vector. The bottom two motion vectors from the top MB, the motion vector of the bottom and the motion vector of the right are used as reference motion vectors for recovering the corrupted motion vector. There can be at most two reference motion vectors from one neighbor MB. If one MB is split into more than two blocks in one dimension, the average of the block motion vectors may be taken as the reference motion vector of a sub-macroblock. Using each reference motion vector, the matching (predicted) MB in the previously reconstructed picture may be located, and the corresponding boundary error may be calculated. The boundary error is defined as the sum of absolute difference between the boundary pixel values of the predicted MB (the "in" pixels in FIG. 4B) and those of the available neighbor reference MBs (the "out" pixels in FIG. 4B. Finally, the reference motion vector with minimum boundary error is selected to be the concealed the motion vector. Similar to the intra concealment method described with respect to FIG. 3, inter-coded macroblock concealment may also encounter the problem of unavailability of some neighbor macroblocks (especially certain direct neighbor macroblocks, such as the right and the bottom macroblocks).

The preceding description outlines the error concealment process at a macroblock level. Common codecs such as AVC (H.264) often perform the decoding process on a macroblock by macroblock basis in order to optimize performance. Those of skill in the art will appreciate that the decoding process may be implemented on different level of granularity, e.g., on a block-by-block basis, a picture-by-picture basis or any other suitable level of granularity. Consequently, error concealment may be applied to larger or smaller picture subdivisions, e.g., from groups of macroblocks down to the pixel level. In the following description, the term "block" may be used interchangeably with the terms macroblock and sub-macroblock. Description of decoding and error concealment at a "block" level, or any other level, of picture subdivision is done for the sake of example and should not be construed as a limitation upon embodiments of the invention.

Embodiments of the present invention present methods and apparatus for concealing corrupted video block pixels after the decoder encounters errors in the video stream. If the video block is intra coded, and all its four direct neighbor blocks (top, bottom, left and right) are available, i.e. either correctly decoded or concealed, the corrupted video block may be concealed using the H.264/AVC suggested method, e.g., as described above with respect to FIG. 3 or FIGS. 4A-4B.

However, in general, if some error happens to a video block in the video stream, it may affect not only that video block, but also all the following blocks until the beginning of the next slice, where a start code is found and the byte is aligned. This means that, for a corrupted video block (or macroblock) its right and bottom neighbor blocks are very likely corrupted as well, assuming the decoding order is from top-left to bottom-right. Further more, in most real-time applications and solutions, the block error concealment is done in sequential order, typically from top-left to bottom-right (or from bottom-right to top left in some occasions). Thus, the right and bottom neighbor blocks of the corrupted video block typically are not yet concealed either. Hence, the weighted average of top and bottom, or left and right reference pixels can not be computed properly, i.e., H.264/AVC suggested method is not applicable.

Thus, previous concealment techniques often require direct neighbor subdivisions that are not available, e.g., have not been previously reconstructed or concealed. To deal with this circumstance, embodiments of the present invention provide general solutions that efficiently utilize available neighbor information without requiring direct neighbor subdivisions that are not available. Such embodiments may be implemented for frame-coded and field-coded pictures.

For example, if a corrupted block is frame-coded, or the first field in a field-coded block pair, it may be concealed by copying the boundary pixels of the top block (if it is available) or by copying the boundary pixels of the left block (if the top block is not available but the left block is available). If both the top and left blocks are not available (e.g., previously decoded or concealed), the present video block is the first block in the picture, assuming the decoding and concealing order is from top-left to bottom-right. Since there is no previous block for reference in this case, the corrupted block is set to blank, i.e. all pixels are set to black or gray or some predefined value. Otherwise, if the block belongs to the second field in a field-coded block pair, it is concealed by copying the entire first-field block.

Figure 5A:
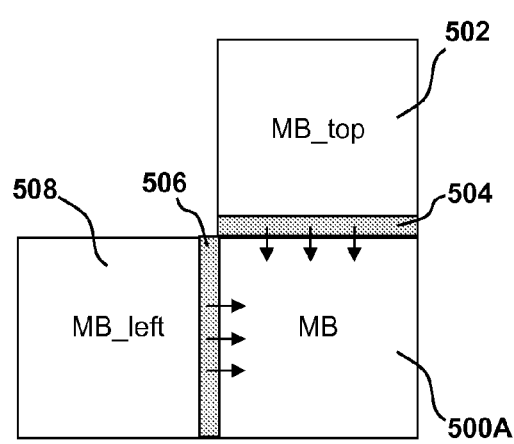
FIGS. 5A-5B are schematic diagrams illustrating concealment of a corrupted intra-coded macroblock according to an embodiment of the present invention.
Figure 5B:
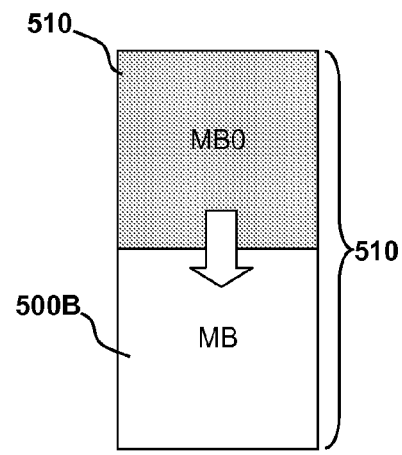

FIGS. 5A-5B illustrate examples of how a corrupt intra-coded MB may be concealed according to embodiments of the present invention. The details of the concealment method may depend to a certain extent on whether the corrupt MB is frame-coded or is the top MB ($MB_0$) in a field-coded MB pair or is the bottom MB ($MB_1$) in a field-coded MB pair. For example, as illustrated in FIG. 5A, if a top reference MB 502 is available, the bottom boundary pixels 504 (in gray) of the top reference MB 502 may be used as top reference pixels. Corrupted pixels in the corrupted macroblock 500A may be concealed by copying a top reference pixel (from the boundary pixels 504) at the same horizontal position as the corrupt pixel. If the top reference MB 502 is not available, e.g., if the corrupt block (or macroblock) is in the first row in the picture, right boundary pixels 506 (in gray) of a left reference MB 508 may be used as left reference pixels. A corrupted pixel may be concealed by copying a left reference pixel (from the boundary pixels 506) at the same vertical position. If neither the top reference MB 502 nor left reference MB 508 is available, e.g. if the corrupted MB is the top-left MB in the picture, all pixels may be set to some predefined value such as 128 (gray).

FIG. 5B depicts a case where the corrupted MB 500B is the bottom MB (i.e. $MB_1$) of a field-coded MB pair 510. In such a case, the corrupted MB 500B may be concealed by copying a top MB 512 (i.e. $MB_0$) of the field macroblock pair 510 to the corrupt MB 500.

If the corrupted block is inter-coded, it may be concealed from one or more matching blocks in one or more previously reconstructed reference pictures. For example, if the corrupted block is a P block, i.e. it belongs to a P slice/picture, it may be concealed by copying the matching block in a forward reference picture. Otherwise, if the corrupt block is a B block, i.e. it belongs to a B slice/picture, a weighted average of the matching blocks in forward and backward reference pictures may be computed as the concealed result. In general, a forward reference picture refers to a picture that comes before the present picture in display order, while a backward reference picture comes after the present picture in display order. The weights may be computed from the distance from the present picture to the reference picture, in time-domain in display order: the longer the distance, the less weight the reference takes.

In order to achieve better concealment (visual) quality, the present invention may locate a matching block with the aid of motion compensation. To do this, the motion vectors of the corrupted video block, which are usually corrupted as well, may need to be recovered. If all four direct neighbor blocks (top, bottom, left and right) of the corrupted block are available, the motion vectors of the corrupted video block can be recovered from the motion vectors of neighbor blocks, such as suggested in H.264/AVC decoder extension, e.g., as described above with respect to FIGS. 4A-4B. However, in real-time applications, all four direct neighbor blocks of the corrupted video block may not be available. In such cases, as with intra-coded video block concealment, the right and bottom neighbor blocks are very likely corrupted as well, while the top and left neighbor blocks are either previously decoded or concealed. Also, the upper-left and upper-right neighbor blocks should be available for reference, either as decoded or concealed blocks. In some cases, such as in H.264/AVC, if the present block is the top one in an MB_AFF block pair, the left-bottom neighbor block is often available too, and may be used as reference for motion vector recovery. Each of these reference blocks (e.g. macroblocks) may have one or more motion vectors, where each motion vector set (x, y) represents the motion activity for one subdivision of a macroblock, e.g., a block or sub-macroblock.

For example, in H.264/AVC, one macroblock can consist of up to 16 blocks, and each of these 16 blocks may have different motion vectors. In embodiments of the present invention, the boundary sub-block (block) motion vectors of the reference blocks (macroblocks) may be used for motion vector recovery. For example, the bottom four sub-block motion vector sets of the top reference block, the right four sub-block motion vector sets of the left reference block, the bottom-right sub-block motion vectors of the upper-left reference block, the bottom-left sub-block motion vectors of the upper-right reference block, and the top-right sub-block motion vectors of the left bottom reference block, if available may be used for motion vector recovery. Using these reference motion vectors, the present invention provides two methods to recover the motion vectors for the corrupted block.

Figure 6:
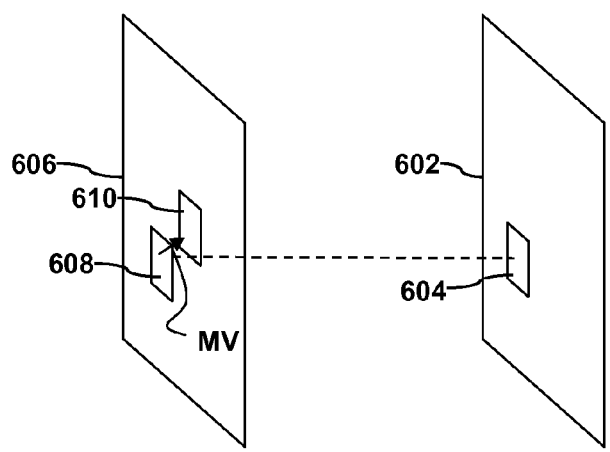
FIG. 6 is a schematic diagram illustrating concealment of a corrupted inter-coded macroblock according to an embodiment of the present invention.

FIG. 6 illustrates a case where an inter-coded MB 604 in a P picture/slice 602, if corrupted, may be concealed from a matching macroblock in a previously reconstructed reference picture 606. In the example depicted in FIG. 6, the P picture 602 is a current P picture which contains the erroneous MB 604. The previously reconstructed picture 606 is used to predict the current picture 602. The previously reconstructed picture 606 contains a co-located macroblock 608, which is located at the same position within the previous picture 606 as the corrupt MB 604 within the current picture 602. A matching MB 610 that corresponds to the corrupt MB 604 may be located using a recovered motion vector MV. The corrupt MB 604 may be concealed by replacing it with the matching MB 610. This process basically involves applying the motion vector MV to location of the co-located macroblock 608 to determine the location of the matching macroblock 610.

There are a number of different ways of recovering the motion vectors for the corrupted block. One low computation cost method is called AVGMV which takes the average of all available reference motion vectors as the concealed motion vectors. Another method, called BESTMV, computes the boundary prediction errors of using all available reference motion vectors, e.g., as described above with respect to FIG. 4B, and then selects the motion vectors resulting in the minimum error as the concealed motion vectors. The concealed motion vector is then used to determine the matching macroblock in the reference picture. The corrupt macroblock is then replaced with the matching macroblock. In general, the BESTMV method provides better concealment quality, but requires more computing power.

Figure 7:
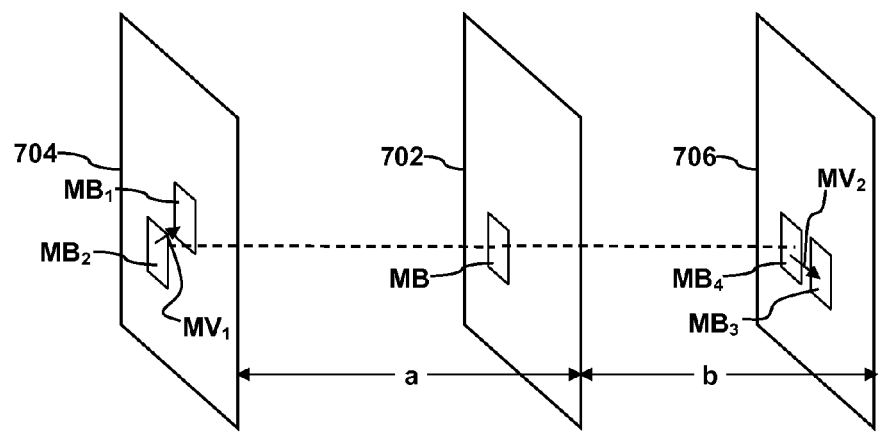
FIG. 7 is a schematic diagram illustrating concealment of a corrupted inter-coded macroblock in a bi-predictive picture or slice according to an embodiment of the present invention.

FIG. 7 illustrates a case where an inter-coded MB in a B picture/slice, if corrupted, may be concealed from its matching macroblocks in previously reconstructed forward and backward reference pictures. As shown in FIG. 7 a current B picture 702 contains a corrupt macroblock MB. A previously reconstructed picture 704 is used for forward prediction when coding the current picture 702. The picture 704 contains a macroblock $MB_1$ that is the matching block of the erroneous MB in the current picture 702. The matching macroblock $MB_1$ may be located using a recovered motion vector $MV_1$ and a macroblock $MB_2$ that is co-located relative to the corrupt macroblock MB in the current picture 702, e.g., as described above with respect to FIG. 6. Another previously reconstructed picture 706 is used for backward prediction when coding the current picture 702. This picture 706 contains a macroblock $MB_3$ that is the matching macroblock of the erroneous macroblock MB. The matching macroblock $MB_3$ may be located by use of recovered motion vector $MV_2$ and a macroblock $MB_4$ that is co-located relative to the corrupt macroblock MB in the current picture 702, e.g., as described above with respect to FIG. 6. Picture 704 is separated from the current picture by a temporal distance a. Picture 706 is separated from the current picture by a temporal distance b. As used herein, the term "temporal distance" may refer to a separation between two pictures in terms of either an amount of time or a number of intervening pictures or some combination of both. The corrupt macroblock MB may be concealed using a weighted average of $MB_1$ and [[$MB_2$,]] $MB_3$, e.g., having the form $(w_1 MB_1 + w_2 MB_3)/2$. The weights $w_1$ and $w_2$ may be computed based on the temporal distances (e.g., in terms of time or number of frames) a and b, e.g., as follows:

$$w_1 = \frac{a}{a+b}$$
$$w_2 = \frac{b}{a+b}$$

Figure 8:
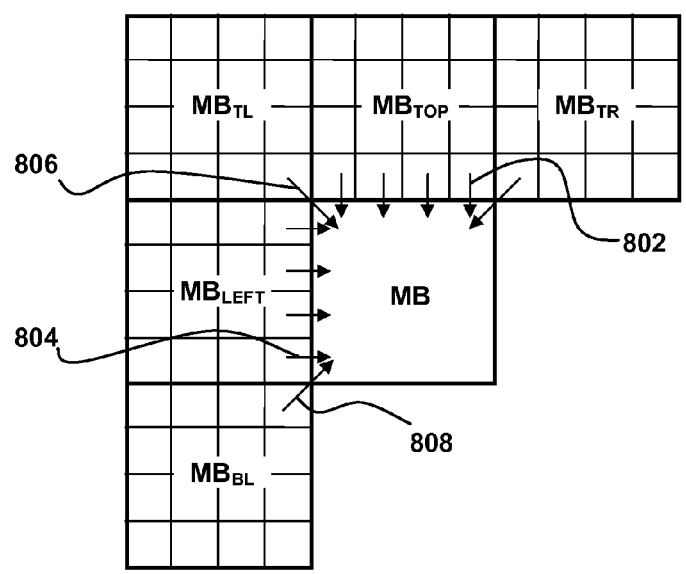
FIG. 8 is a schematic diagram illustrating concealment of motion vectors for a corrupted inter-coded macroblock according to an embodiment of the present invention.

FIG. 8 illustrates an example of how the motion vector of a corrupted inter macroblock may be concealed from decoded or concealed neighbor reference motion vectors. Which neighbor macroblocks are available for concealment depends partly on the decoding and concealment order. Assuming the decoding and concealment order is from top-left to bottom-right, the corrupted MB has available the following reference macroblocks: a top macroblock $MB_{top}$ (if MB is not the first row in the picture), a left macroblock $MB_{left}$ (if MB not in the leftmost column in the picture), a top-left macroblock $MB_{TL}$ (if MB is in neither the first row nor the most left column in the picture), a top-right macroblock $MB_{TR}$ (if MB is in neither the first row nor the rightmost column in the picture) and a bottom-left macroblock $MB_{BL}$ (if applicable, e.g., if MB is not in the bottom row of the picture).

Each of these reference macroblocks may contain one or more blocks (or sub-macroblocks), and each of these blocks (or sub-macroblocks) has its own motion vector. Among them, the immediate neighbor block motion vectors, e.g., the motion four vectors 802 of the bottom row of blocks of the top macroblock $MB_{top}$, motion vectors 804 of the blocks in the rightmost column of blocks in the left macroblock $MB_{left}$, the motion vector 806 of the top-left macroblock $MB_{TL}$, the motion vector 808 for the top-right macroblock $MB_{TR}$, and the motion vector 810 for the bottom left macroblock $MB_{BL}$ may be used for recovery of the corrupted MB motion vector.

The motion vector for the corrupt macroblock MB may be determined using one or more of the reference motion vectors 802, 804, 806 808, and 810. Embodiments of the present invention provides two motion vector recovery methods: AVGMV and BESTMV. The AVGMV method takes the average of all available reference motion vectors as the concealed motion vector. The BESTMV method computes the boundary prediction errors of using all available reference motion vectors, and then selects the motion vectors resulting in the minimum error as the concealed motion vector. A method for calculating boundary errors is illustrated and described above with respect to FIG. 4B. In general, the BESTMV method results in better concealment quality than AVGMV, but requires more computing power.

In embodiments of the present invention, a weighted average of available motion vectors from the available neighbor macroblocks. The weights may be based on the number of pixels associated with each motion vector. For example, the weight from a macroblock being assigned more weight that a motion vector from a sub-macroblock and each motion vector from a sub-macroblock being assigned more weight that a motion vector from a block. By way of numerical example, each of the four motion vectors 802 from the bottom row of blocks in the top macroblock $MB_{top}$ may be assigned a weight of 1. Similarly each of the four motion vectors 804 from the rightmost row of blocks in the left macroblock $MB_{left}$ may be assigned a weight of 1. The motion vectors 806, 808 and 810 associated with the top left, top right and bottom left macroblocks $MB_{TL}$, $MB_{TR}$ and $MB_{BL}$ may each be assigned a weight of 4 (since each is made up of 4×4 blocks). If a motion vector is associated with a sub-macroblock (made up of 2×2 blocks) it may be assigned a weight of 2.

Figure 9:
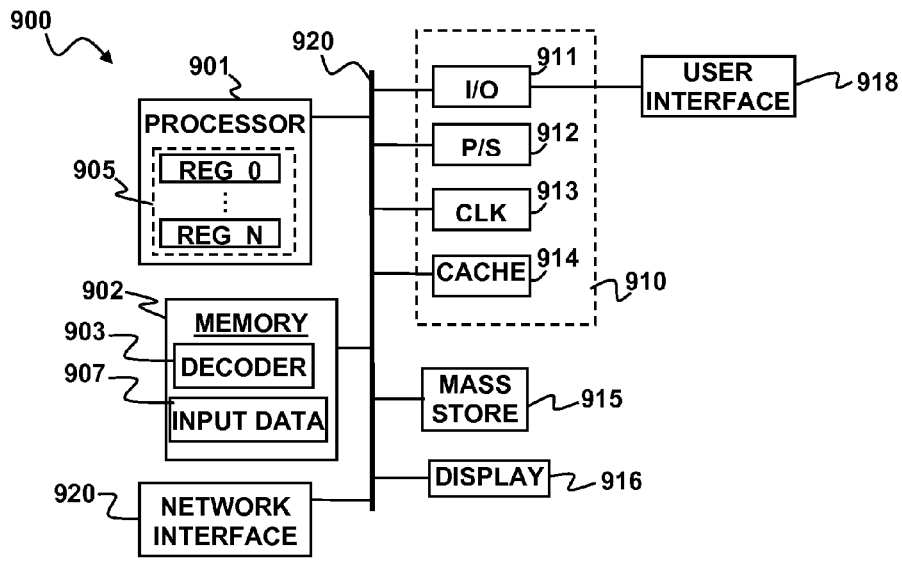
FIG. 9 is a block diagram illustrating an apparatus for impending error concealment in streaming data decoding according to an embodiment of the present invention.

FIG. 9 illustrates a block diagram of a computer apparatus 900 that may be used to implement error concealment as described above. The apparatus 900 generally includes may include a processor module 901 and a memory 902. The processor module 901 module may include a single processor or multiple processors. As an example of a single processor, the processor module 901 may include a Pentium microprocessor from Intel or similar Intel-compatible microprocessor. As an example of a multiple processor module, the processor module 901 may include a Cell processor. Cell processors are described in detail, e.g., in Cell Broadband Engine Architecture, which is available online and which is incorporated herein by reference.

The memory 902 may be in the form of an integrated circuit, e.g., RAM, DRAM, ROM, and the like). The memory may also be a main memory or a local store of a synergistic processor element of a cell processor. A computer program 903 may be stored in the memory 902 in the form of processor readable instructions that can be executed on the processor module 901. The processor module 901 may include one or more registers 905 into which compressed signal input data 907 may be loaded from the memory 902. The computer program 903 may be a decoder program configured to decode the compressed signal data, e.g., as described above with respect to FIG. 2, and implement error concealment, e.g., as described above with respect to any or all of FIG. 3, FIG. 4A, FIG. 4B, FIG. 5, FIG. 6, FIG. 7, and FIG. 8. The program 903 may be written in any suitable processor readable language, e.g., C, C++, JAVA, Assembly, MATLAB, FORTRAN and a number of other languages. The apparatus 900 may also include well-known support functions 910, such as input/output (I/O) elements 911, power supplies (P/S) 912, a clock (CLK) 913 and cache 914. The device 900 may optionally include a mass storage device 915 such as a disk drive, CD-ROM drive, tape drive, or the like to store programs and/or data. The device 900 may also optionally include a display unit 916 and user interface unit 918 to facilitate interaction between the device 900 and a user. The display unit 916 may be in the form of a cathode ray tube (CRT) or flat panel screen that displays text, numerals, graphical symbols or images. The user interface 918 may include a keyboard, mouse, joystick, light pen or other device that may be used in conjunction with a graphical user interface (GUI). The apparatus 900 may also include a network interface 920 to enable the device to communicate with other devices over a network, such as the internet. These components may be implemented in hardware, software or firmware or some combination of two or more of these.

Figure 10:
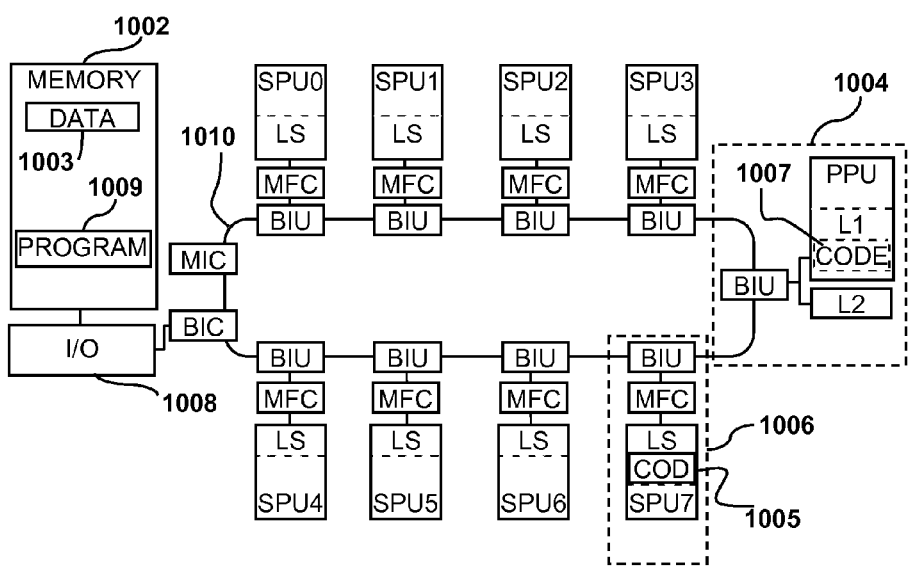
FIG. 10 is a block diagram illustrating Cell processor apparatus for implementing error concealment in streaming data decoding according to an embodiment of the present invention.

The methods described above may be implemented with a processing module capable of implementing parallel processing. As used herein processing in parallel means that, to some extent the processing of different tasks overlaps in time. One example, among others of a processing module capable of implementing parallel processing is a cell processor. There are a number of different processor architectures that may be categorized as cell processors. By way of example, and without limitation, FIG. 10 illustrates a type of cell processor 1000. By way of example, the cell processor 1000 may be characterized by an architecture known as a Cell Broadband engine architecture (CBEA)-compliant processor. For the purposes of example, the cell processor 1000 is depicted as having only a single SPE group and a single PPE group with a single SPE and a single PPE. Alternatively, a cell processor can include multiple groups of power processor elements (PPE groups) and multiple groups of synergistic processor elements (SPE groups). Hardware resources can be shared between units within a group. However, the SPEs and PPEs must appear to software as independent elements.

The cell processor 1000 includes a main memory 1002, a single power processor element (PPE) 1004 and eight synergist processor elements (SPEs) 1006. However, the cell processor 1001 may be configured with any number of SPE's. With respect to FIG. 10, the memory, PPE, and SPEs can communicate with each other and with an I/O device 1008 over a ring-type element interconnect bus 1010. The memory 1002 may contains input data in the form of streaming data, e.g., from a coded video stream. The memory 1002 may also contain a program 1009 having features in common with the program 903 described above. At least one of the SPE 1006 may include in its local store instructions 1005 that implement error concealment, e.g., as described above with respect to FIG. 3, FIG. 4A, FIG. 4B, FIG. 5, FIG. 6, FIG. 7, FIG. 8 or some combination of two or more of these. The PPE 1004 may include in its L1 cache, code 1007 instructions that may implement decoding, e.g., as described with respect to FIG. 2 above. Instructions 1005, 1007 may also be stored in memory 1002 for access by any of the SPE 1006 and PPE 1004 when needed.

Implementation of embodiments of the present invention on a cell processor facilitates parallel processing of the decoding method 200 and associated computational efficiency and performance. Examples of such parallel processing in decoding streaming data are described e.g., in U.S. Provisional Patent Application 60/823,605, to Shan Liu et al., entitled "SYSTEM AND METHODS FOR DETECTING AND HANDLING ERRORS IN A MULTI-THREADED STREAMING DATA DECODER", which has been incorporated herein by reference above.

Embodiments of the invention thus provide methods and apparatus for concealing corrupted video blocks, both intra and non-intra (inter) coded. Such methods may be adopted by most existing video codecs, especially motion-compensated ones such as MPEG-1/2/4, H.261/3/4, etc. Consequently products and services that utilize video decoding may benefit from embodiments of the present invention. Examples of such products and services include, but are not limited, to video game consoles, DVD players, software (PC) video decoder/player, video on cell phone, streaming video, video on demand, and the like.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for.

What is claimed is:

1. A method for error concealment of corrupted streaming data, comprising:
    using one or more processors to determine whether a subdivision of the streaming data is a corrupt subdivision;
    using one or more processors to conceal the corrupt subdivision by replacing a corrupt subdivision of a field coded pair of subdivisions containing the corrupt subdivision and another subdivision with the other subdivision of the field-coded pair.

2. The method of claim 1, wherein corrupt subdivision is a bottom subdivision of a field-coded pair of subdivisions, and one or more processors conceal the subdivision by replacing the corrupt subdivision with a top subdivision of the field-coded pair.

3. An apparatus for error concealment of corrupted streaming data, comprising:
    a processor module having one or more processors;
    a memory operably coupled to the processor module; and
    a set of processor executable instructions adapted for execution by the processor module, the processor executable instructions including:
    one or more instructions that when executed on the processor module determine whether a subdivision of the streaming data is a corrupt subdivision; and
    one or more instructions that when executed on the processor module conceal the corrupt subdivision by replacing a corrupt subdivision of a field coded pair having another subdivision with the other subdivision of the field-coded pair.

4. The apparatus of claim 3 wherein the processor module includes two or more processor elements.

5. The apparatus of claim 3 wherein the processor module is a cell processor having one or more synergistic processor elements (SPE), wherein each SPE includes a synergistic processor unit (SPU) and a local store.

6. The apparatus of claim 5 wherein the processor is a SPE and the memory is the local store of the SPE.

7. A non-transitory processor readable medium having embodied therein processor readable instructions for implementing a method for error concealment of corrupted streaming data, the method comprising:
using one or more processors to determine whether a subdivision of the streaming data is a corrupt subdivision;
using one or more processors to conceal the corrupt subdivision by replacing a corrupt subdivision of a field coded pair of subdivisions containing the corrupt subdivision and another subdivision with the other subdivision of the field-coded pair.

8. A method for error concealment of corrupted streaming data, comprising:
using one or more processors to determine whether a subdivision of the streaming data is a corrupt subdivision;
using one or more processors to conceal the corrupt subdivision by either (a) replacing a corrupt subdivision of a field coded pair of subdivisions containing the corrupt subdivision and another subdivision with the other subdivision of the field-coded pair; or (b) locating a matching subdivision in a previously reconstructed reference picture and replacing the corrupt subdivision with the matching subdivision, wherein the corrupt subdivision is a bottom subdivision of a field-coded pair of subdivisions, and one or more processors conceal the subdivision by replacing the corrupt subdivision with a top subdivision of the field-coded pair.

9. The method of claim 8, wherein the reference picture is a different reference picture than a picture containing the corrupt subdivision.

10. The method of claim 8, wherein the corrupt subdivision is a predictive subdivision, and locating the matching subdivision includes applying a motion vector of a co-located subdivision in the reference picture to the corrupt subdivision.

* * * * *